June 6, 1933.  G. H. BARNES, JR  1,913,327
METHOD OF MAKING HOSE
Filed Aug. 28, 1931
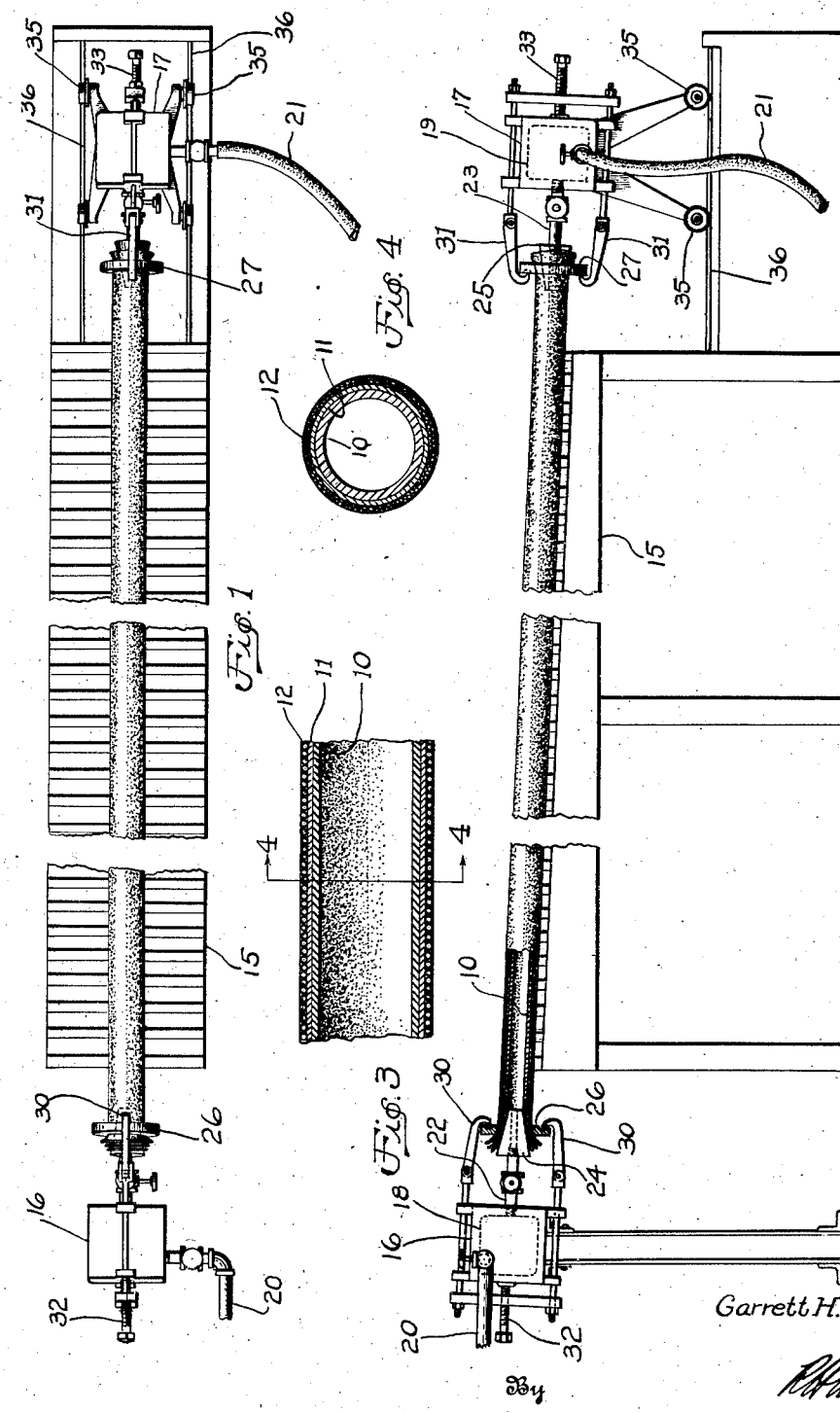
Inventor
Garrett H. Barnes Jr.
By
Attorney Patented June 6, 1933

1,913,327

UNITED STATES PATENT OFFICE

GARRETT H. BARNES, JR., OF SILVER LAKE, OHIO, ASSIGNOR TO THE GOODYEAR TIRE & RUBBER COMPANY, OF AKRON, OHIO, A CORPORATION OF OHIO

METHOD OF MAKING HOSE

Application filed August 28, 1931. Serial No. 559,904.

This invention relates to the method of making hose and more particularly to the method of making cotton jacketed hose of relatively large diameters.

Heretofore in the production of cotton jacketed hose, a number of methods have been employed with varying success. In the most widely used prior method a section of rubber tube, approximately fifty feet in length, was formed and thereafter semi-cured in an open vulcanizer. The tube could be produced by a number of methods, either by extrusion or by calendering up the rubber into sheets of the proper width and thereafter folding the sheet to form a tube. The semi-cured tube was then taken and coated with cement on the outside and backed with a thin sheet of unvulcanized rubber, after which the treated tube was pulled through a braided cotton jacket. The assembly was then vulcanized by passing the steam through the tube or hose, which steam was at sufficient pressure to press the semi-cured tube and the gum thereon into intimate contact with the cotton jacket, in which position it was vulcanized.

This laborious process was necessitated by the fact that the rubber tube initially formed had to be semi-cured to be pulled through the cotton jacket. It was found that the semi-cured tube had to be backed with the unvulcanized rubber sheet so that an intimate bond would be secured between the rubber tube and the cotton jacket. This process entailed considerable labor and was slow and inefficient. Moreover the hose obtained had an internal bore which was rough or corrugated due to the fact that the pressure of the internal curing steam forced the rubber hose between the cords of the cotton jacket so that the hose offered considerable friction to the passage of water therethrough.

It is an object of the present invention to avoid and overcome the foregoing difficulties and prior known methods of constructing cotton jacketed hose by the provision of a rapid, efficient, practical manner for constructing hose of this type.

Another object of the invention is to provide a method for manufacturing hose wherein a hose is produced having a continuously smooth internal bore.

Another object of the invention is to provide a method for making rubber hose, which method employs a long flexible airbag, or other inflatable former, upon which the hose is constructed and vulcanized.

Another object of the invention is to provide a method of producing cotton jacketed hose wherein the step of semi-curing the rubber tube is eliminated.

Another object of the invention is to provide a method of manufacturing cotton jacketed hose, which method eliminates the step of backing the rubber hose with a sheet of unvulcanized gum before it is inserted in the cotton jacket.

Another object of the invention is to provide a new and improved method of making hollow conduits or hose.

For a better understanding of the invention, reference may now be had to the accompanying drawing, forming a part of the specification, wherein:

Fig. 1 is a plan view of apparatus whereby the inventive method can be executed;

Fig. 2 is a side elevation of the apparatus illustrated in Fig. 1;

Fig. 3 is a longitudinal cross-sectional view of a segment of the cotton jacketed hose with the airbag mandrel illustrated internally of the hose; and Fig. 4 is a cross-sectional view taken on line IV—IV of Fig. 3.

In practicing the invention, a long flexible airbag, or mandrel, which is indicated at 10 in the accompanying drawing, is provided, which airbag is of a composition similar to that of the ordinary airbag employed in the vulcanization of pneumatic tires. The airbag has for its outer diameter the diameter which will be given the internal bore of the finished hose, and the airbag may be formed in any lengths which can be readily handled, which lengths are generally in the neighborhood of fifty feet; however this length may be widely varied as found necessary or desirable.

The airbag 10 is preferably first inflated although not necessarily so, and is thereafter covered with a layer of rubber 11 by any known manner. This operation may comprise calendering rubber into sheets, cutting the sheets into appropriate lengths and widths, and wrapping the sheets upon the airbag 10. Again the airbag 10 may be covered by passing it through an extruding machine in such a manner that a sheathing of rubber will be extruded about the airbag in its passage through the extruding machine.

The airbag 10 with the layer or sheathing of rubber 11 thereon is now passed through a standard hose braiding machine which will apply a braided jacket 12, generally of cotton, over the laminated structure. It will be understood that the invention contemplates preforming a braided jacket and pulling the preformed jacket over the airbag 10 and rubber sheath 11. However, this is not the preferred method of construction.

The hose is now ready for the vulcanizing step, which is accomplished by inflating the airbag 10 with steam, or other suitable medium at curing temperature and pressure. In this manner the rubber sheath 11 will be vulcanized securely to the inside of the braided jacket 12 and at the same time will be provided with a smooth internal bore due to its contact with the internal airbag 10. After the curing operation, the airbag 10 will be deflated and removed from the cured hose.

While the method and particularly the vulcanizing operation may be performed by any suitable apparatus, the accompanying drawing illustrates one form of mechanism whereby the inventive method may be performed, which apparatus includes a long table 15 upon which the hose may be built and upon which it is adapted to be supported during the curing operation. The table is preferably inclined so that any condensation which occurs in the airbag 10 during the curing operation will drain to one end of the bag and will be discharged.

In order to pass steam, gas, or other curing fluid to the interior of the airbag 10, a pair of headers 16 and 17 are provided, which headers have steams chests 18 and 19 which are connected respectively to a source of steam supply and exhaust by conduits 20 and 21. From the steam chests 18 and 19, pipes 22 and 23 extend to conical plugs 24 and 25 which are adapted to be inserted in the opposite ends of the airbag 10. Cooperating with the plugs 24 and 25 are plates 26 and 27 having circular openings therein so that the plates will slide over the ends of the hose and can thereafter be moved back to clamp the ends of the hose against the conical plugs 24 and 25. The plates 26 and 27 are clamped in position by any suitable means which may take the form of a pair of hooked arms 30 and 31 which are moved longitudinally of the plugs 24 and 25 by screws 32 and 33.

In order to take care of any variations in length of the laminated hose to be cured the header 17 may be mounted upon rollers 35 which ride upon track 36 so that the header may be moved longitudinally of the laminated hose.

Steam, or other vulcanizing fluid, under vulcanizing pressure and temperature will be admitted to the header 16 through the conduit 20 and will pass through the passage 22, conical plug 24, to the interior of the airbag 10, and from which it will be removed through the plug 25, passage 23 and header 17, by way of the exhaust or return conduit 21. The cotton jacket 12 will support the rubber 11 from the outside, while the airbag 10 will support and mold the rubber 11 from the inside. Thus a smooth internal bore in the hose will be secured, as well as a good positive bond between the rubber 11 and jacket 12.

It will be understood that the apparatus for performing the method may take a plurality of forms without departing from the fundamental principles of the inventive method. For example, the airbag 10 may be closed and provided at its ends with valve stems which can be connected to a source of vulcanizing steam. Again if found necessary or desirable, the cotton jacket 12 may be reinforced with a supporting mold during the vulcanizing operation.

It will thus be seen that a method for manufacturing hose having a braided jacket has been provided, wherein all semi-curing operations are eliminated. Moreover the method eliminates the necessity of all backing operations and produces a hose having a smooth internal bore. The operations are performed with a minimum of time, labor and materials and all steps of pulling the partially cured hose through a braided jacket may be eliminated.

It will be understood that it is within the province of the invention to manufacture substantially any known type of hose by the improved process, which hose is, or is not, covered with a braided jacket, and which may, or may not, be provided with fabric reinforcement. In certain constructions it may be necessary or desirable to support the outside of the hose during the vulcanizing operation.

More particularly the invention contemplates producing laminated hose having an internal tube of rubber, an intermediate layer of reinforcing fabric and an outer layer of rubber by the present method, and also broadly contemplates manufacturing hose of any type, length or diameter with the assistance of an internal airbag or core upon which the hose is built and which is left in the hose during the vulcanizing operation.

Although I have illustrated only the preferred form which my invention may assume and have described that form in detail, it will be apparent to those skilled in the art that the invention is not so limited, but that various modifications may be made therein without departing from the spirit of the invention or from the scope of the appended claims.

What I claim is:

1. The method of making hose which comprises providing a long, hose-like flexible, vulcanized-rubber, airbag, forming a tube of unvulcanized rubber over the airbag, applying a fabric layer of reinforcing cord over the rubber tube, vulcanizing the hose thus formed by passing curing fluid or gas at vulcanizing temperature and substantial pressure through the interior of the airbag and thereafter exhausting and removing the airbag from the interior of the hose.

2. The method of making hose which comprises providing a long, hose-like, vulcanized-rubber, airbag, forming a tube including unvulcanized rubber over the airbag, vulcanizing the hose thus formed by passing curing fluid at vulcanizing temperature and substantial pressure through the interior of the airbag and thereafter exhausting and removing the airbag from the interior of the hose.

3. The method of making hollow conduits which comprises providing a long, hose-like, flexible, vulcanized-rubber, airbag, forming a tube of unvulcanized rubber over the airbag, applying a fabric layer of reinforcing cord over the rubber tube, vulcanizing the hose thus formed by passing curing fluid at vulcanizing temperature and substantial pressure through the interior of the airbag.

4. The method of making hose comprising providing a tubular mandrel of vulcanized rubber, building up an unvulcanized hose on the mandrel, vulcanizing the hose by passing fluid at vulcanizing temperatures and pressure through the interior of the mandrel and thereafter removing the mandrel.

5. The method of making a conduit comprising providing a tubular mandrel of rubber, building up a conduit on the mandrel, vulcanizing the conduit by passing fluid at vulcanizing temperature and pressure through the interior of the mandrel.

6. That method of making hose which comprises providing a tubular vulcanized rubber core, forming a sheathing of unvulcanized rubber over the rubber core, forming a reinforcing jacket over the rubber sheath, clamping the ends of core, sheath and jacket together, vulcanizing the sheath to the jacket by passing fluid at vulcanizing temperature through the interior of the core, unclamping the ends of the core, sheath and jacket and removing the core from the assembly leaving the sheath vulcanized to the interior of the jacket.

7. That method of making hose which comprises providing a tubular, vulcanized-rubber core, forming a sheathing of unvulcanized rubber over the rubber core, forming a reinforcing jacket over the rubber sheath, clamping the ends of the core, sheath and jacket together, vulcanizing the sheath to the jacket, unclamping the ends of the core, sheath and jacket and removing the core from the assembly leaving the sheath vulcanized to the interior of the jacket.

8. That method of making hose which comprises providing a tubular vulcanized rubber core, forming a sheathing of unvulcanized rubber over the rubber core, forming a reinforcing jacket over the rubber sheath, stretching the core, sheath and jacket by means secured to the ends thereof, vulcanizing the sheath to the jacket by passing fluid at vulcanizing temperature through the interior of the core, said vulcanizing operation being performed while the assembly is held in the stretched condition and removing the core from the assembly leaving the sheath vulcanized to the interior of the jacket.

In witness whereof, I have hereunto signed my name.

Signed at Akron, in the county of Summit and State of Ohio, U. S. A., this 27th day of August, 1931.

GARRETT H. BARNES, Jr.